Nov. 27, 1951  P. J. CARPENTIER  2,576,749
METHOD OF PRODUCING LIGHT AND
RESISTANT CELLULAR BODIES

Filed May 5, 1948  5 Sheets-Sheet 1

INVENTOR:
Pascal J. Carpentier

By: [signature]
His Agent

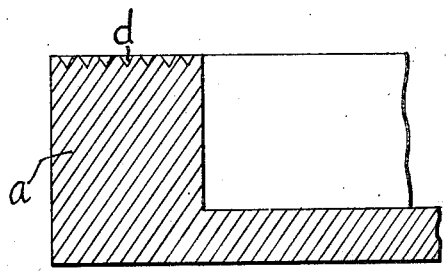
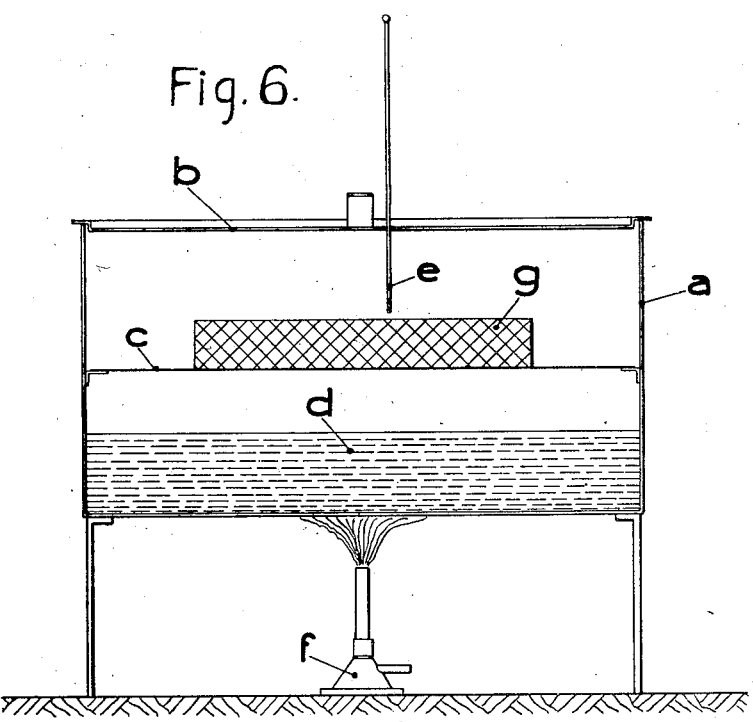
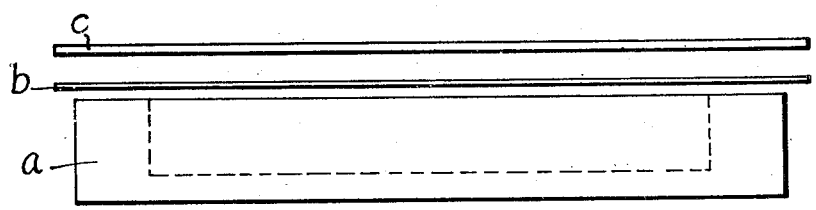

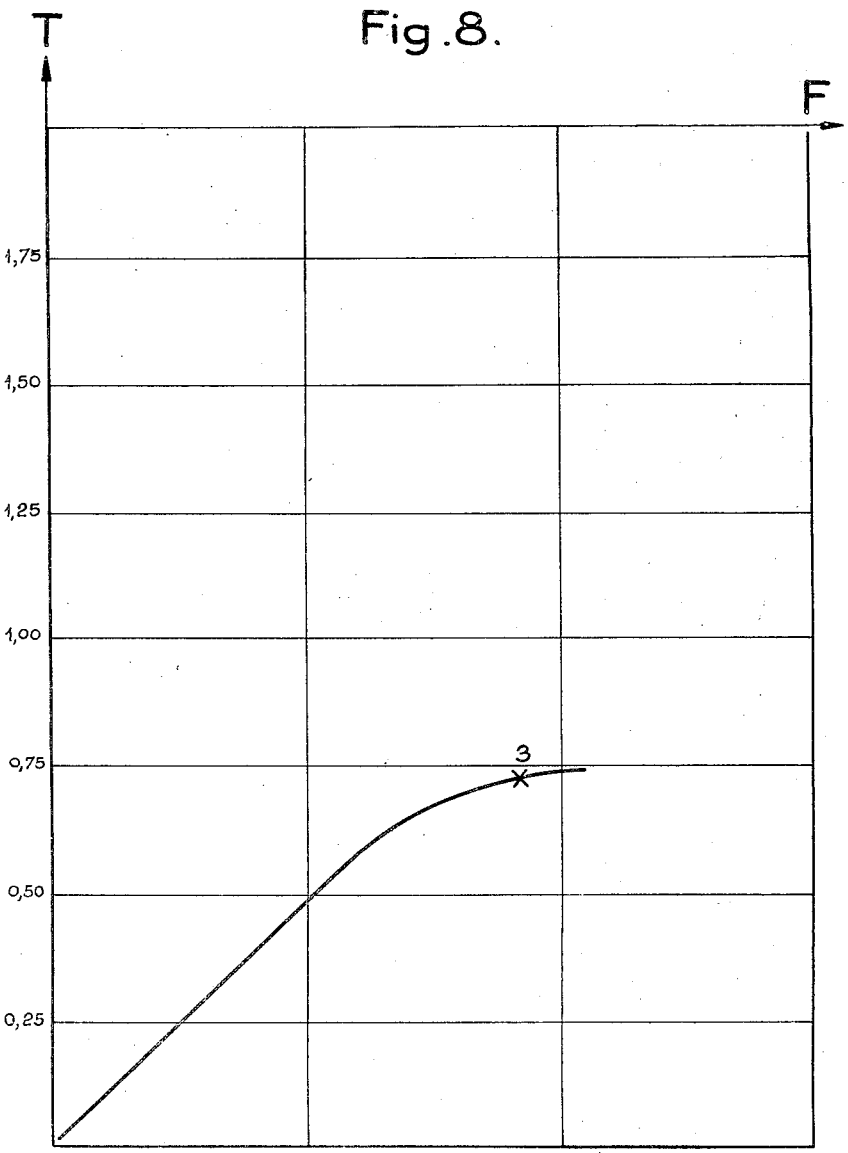

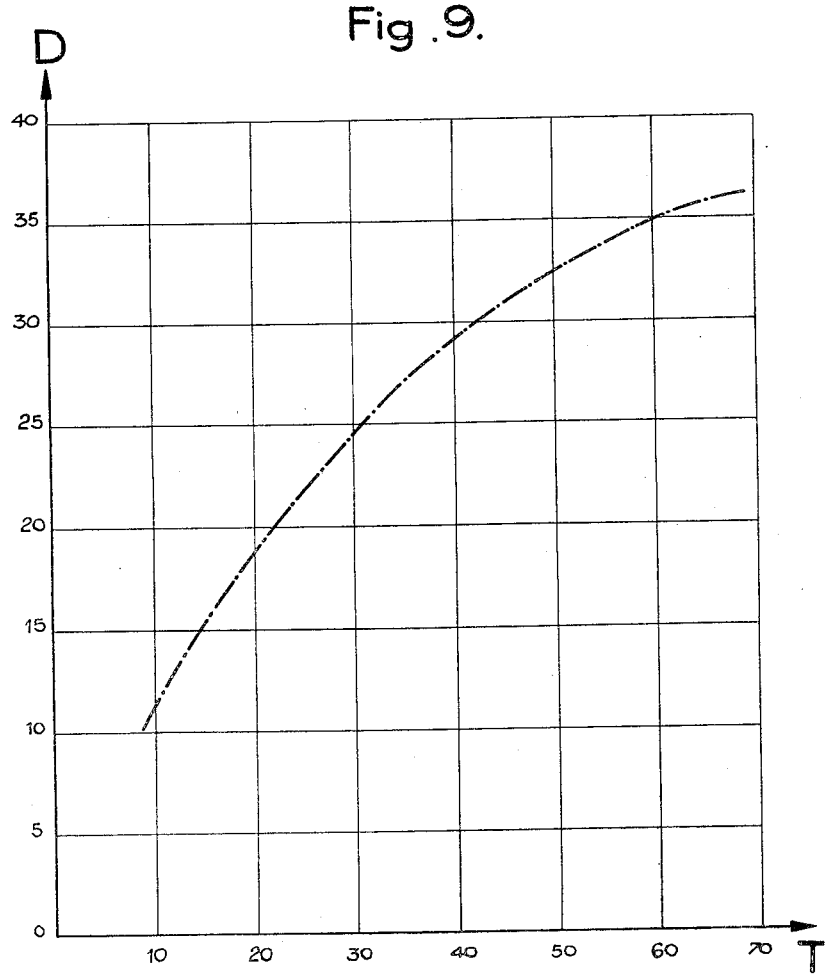

Patented Nov. 27, 1951

2,576,749

UNITED STATES PATENT OFFICE 2,576,749

METHOD OF PRODUCING LIGHT AND RESISTANT CELLULAR BODIES

Pascal J. Carpentier, Paris, France

Application May 5, 1948, Serial No. 25,288
In France May 9, 1947

6 Claims. (Cl. 18—47.5)

In my copending application, Serial No. 744,832, filed April 30, 1947, now Patent 2,524,039, I have described procedure for forming cellular bodies. Such method, in common with processes known in the art, comprises incorporating a gas blowing agent, typically a finely divided solid substance, into a finely divided plastic and heating the dry mixture in a closed mold, whereby gas is evolved by the gas blowing agent and is distributed throughout the plastic to convert the same to a cellular product. Further, as disclosed therein, such gas blowing agent may be azo-isobutyric dinitrile or other typical gas blowing agent known in the art. In addition, in my copending application, Serial No. 11,813, filed February 27, 1948, dry, finely divided gas blowing agents such as diamino benzene and nitrourea are further disclosed as typical finely divided dry gas blowing agents which are themselves inert to other components of the cellular body forming mixture and generate an inert gas by heating whereby a cellular product is formed.

The present invention relates to a new operation in which an initial thermoplastic cellular body consisting of closed cells, which has been produced in accordance with a process known but modified in such a way as to ensure that the cellular body contains predetermined quantities of a certain ingredient "A," is treated from the exterior by a medium "B," penetrating into the cellular body from the exterior and which medium "B" meets within the cellular body with the ingredient "A" and enters with same into a chemical reaction "R," which reaction produces a solid "D" which is stiffer than the ingredient "A," and, in this way, serves to stiffen the cellular body, and which reaction "R" produces at the same time a gas "E" which expands the cellular body and increases its volume.

Such a cellular body consists principally of a solid homogeneous material forming the walls of its closed cells, and of a gas occluded in said cells. The total of the solid material forming the walls of the cells will be called the solid skeleton of the cellular body. This skeleton is composed in the main by a thermoplastic and such accessory components as plastifiers, dyestuffs, stabilizers and certain quantities of the ingredient "A." In most cases, these quantities of the ingredient "A" will be incorporated and uniformly distributed in the homogeneous mix out of which the cellular body is produced, so as to insure that the ingredient "A" is uniformly distributed and contained throughout the skeleton of the cellular body. In other cases, other ingredients will be incorporated in said mix which will react with each other, thereby producing the ingredient "A" at any time during production or treatment, however in time to be ready for the reaction "R" before the ingredient "B" penetrates into the cellular body. The ingredient "A" will be defined in detail later on.

The medium "B," which will be defined in detail later on, will advantageously be, at operating conditions, in the state of a gas or vapor, in order to facilitate its penetration into the cellular body.

The reaction "R" which will be defined in detail later on, takes place within the walls of the cells wherever a particle of the ingredient "A" contained within said walls is met by a particle of the medium "B."

Each particle of the gas "E" created by the reaction "R" has a tendency to occupy the volume corresponding to prevailing temperature and pressure conditions. In that way it exercises pressure on the confining cell walls, and the total gas "E" created has a tendency to expand the skeleton. If the resistance offered by the skeleton to expansion is superior to the expansion force exercised by the gas, volumes of gas equivalent to those created by said reaction "R" will, in due course, diffuse out of the cellular body. If on the contrary the expansion force of said gas is superior to the resistance of the skeleton, the cellular body will expand. In order to ensure this effect, the skeleton should, therefore, be plastic and ductile at operation temperature. Such uniform and sufficient plasticity will also help in insuring an uniform extension of all parts of the cellular body in all directions, thus producing an enlarged replica of the initial cellular body.

The thermoplastic constituting the main component of the skeleton will, therefore, be blended in a way common in the art, with other auxiliary components such as plastifiers, in order to render it, at operation temperature, sufficiently plastic and ductile, whereas, when cooled back to normal temperature, it will be rigid and thereby stabilized in its expanded state. This rigidity and stability are furthered by the second phenomenon resulting from said reaction "R" as follows: Each particle of the solid "D" created by the reaction "R" is stiffer than the particle of the ingredient "A" out of which it has been produced, and will therefore stiffen the cell wall at this very spot. Since a particle of gas "E" has been produced out of the same particle "A" by the same reaction "R" at the same time, the cell wall finds itself stiffened at the very spot where its stretching occurs, and when it occurs, which contributes considerably to stabilize the skeleton in its expanded form. By the creation of "D" throughout the cell walls, the skeleton as a whole is stiffened and in this way the cellular body as such is rendered more rigid which signifies more resistance against deformation by at least one type of external forces such as for instance pressure, flexion, tension, torsion.

The ingredient "A" and the medium "B" can be of such nature that the reaction "R" between them creates only a solid "D," which is stiffer than was the ingredient "A" and no gas "E," or else it creates only a gas "E" and no solid "D," or it creates only a gas "E" and a material which however is not stiffer than was the ingredient "A" and therefore cannot be considered as a solid "D" corresponding to our notion.

Several different ingredients "A" may be employed instead of one single only, and several different mediums "B" may penetrate into cellular body with the result that several different reactions take place each between one ingredient "A" and one medium "B," each of such reactions producing a solid "D" and a gas "E," or one only of the two.

Two different ingredients "A" may be employed, of such a nature, that they enter with each other into a reaction "R" producing a solid "D" and a gas "E," or one only of the two, at operating conditions and under the influence of the medium "B" penetrating into a cellular body and encountering the two ingredients "A," which medium "B," in this case, acts as a catalyst only, provoking such reaction "R" between the two ingredients "A" without reacting itself.

The practical execution of the operation and its effects on the cellular body may in a large extent be influenced by the nature of the cellular body selected for the treatment, by varying the ingredient "A" and the medium "B" as to their nature and the quantities employed, as well as by varying the operation conditions proper. For instance a cellular body having a very tough and hard skeleton will cede less to the pressure exercised by a gas created in its interior than one having a ductile and soft skeleton. Larger quantities of ingredient "A" and of medium "B" producing by the reaction "R" larger quantities of the gas "E" and of the solid "D" will have a more pronounced effect on the cellular body than will small quantities. And as to varying operating conditions, the forcing of larger quantities of the ingredient "B" into the cellular body within shorter time will speed up the reaction "R." An higher operating temperature will give the same effect. If for instance the operation is carried out at a temperature at which the skeleton is particularly ductile and plastic, and in consequence specially disposed to give way to the internal pressure exercised by the gas "E," and if, at the same time, this internal pressure is especially high because large quantities of gas are created within short time on account of the reaction "R" having been sped up as explained before, these operating conditions will favour the increase of the volume of the cellular body.

The operation and its effects on the cellular body may further be influenced by varying the external pressure exercised on the cellular body during said operation, for instance by operating in an autoclave at over or under pressure, or by varying the duration of the treatment. I have also varied operating conditions in the course of the operation itself, for instance by gradually increasing the temperature from normal to the desirable maximum during treatment.

In case of a pronounced increase in the volume of the cellular body, it may be possible that in spite of the stiffening of the material forming the skeleton, the resistance of the expanded cellular body against deformation, figured per square inch of its surface or per cubic inch of volume, is less than it was for the same cellular body before the treatment as per invention took place, and this because, in a given cellular body, when it is expanded and its volume is increased, the skeleton is normally weakened by this expansion and its resistance against deformations is therefore reduced.

If the increase in volume is less pronounced the increase in resistance against deformation of the cellular body will be more manifest. This may, for instance, be achieved by operating at a low temperature, at which the material of the skeleton is less ductile and plastic. Allowing only small quantities of ingredient "B" to penetrate into the cellular body per time unit will have a similar effect inasmuch as the gas has time to diffuse out of the cellular body almost at the same rate as it is created, with the result that the quantities of such gas and the internal pressure exercised by it within the cellular body are not sufficient to overcome the resistance of the skeleton against expansion, whereas the effect of the simultaneously created stiffening solid "D" is accumulative, irrespective of the speed of reaction "R" or of the state of the cellular body.

Another way of influencing the operation and its results is by incorporating inferior proportions of the ingredients "A" in certain parts only of the cellular body, or by eliminating or rendering inefficient some of this ingredient "A" contained in certain parts of the cellular body, or by protecting parts of the cellular body against the penetration of the medium "B," all this with the immediate result that the reaction "R" does not take place throughout the cellular body in an uniform manner.

As an ingredient "A" may be employed for instance an organic mono- or poly-isocyanate. Also several different organic isocyanates may be employed within the same cellular body either pure or mixed with one or more of their urethanes. It is, in this case, advantageous to incorporate such isocyanates in the homogeneous mix out of which the cellular body is produced and to allow this mixture to repose for several hours before it is used for production. In case such isocyanates are employed as ingredients "A" the corresponding medium "B" may be the vapor of water employed in practice for instance by exposing the cellular body containing such isocyanates to a normal air atmosphere or to an air or other atmosphere enriched, saturated or oversaturated with vapor of water, at normal or elevated or reduced temperature, by exercising on to the cellular body a normal or higher or lower external pressure, for instance, by working in an autoclave.

In order to explain the basic chemistry of my invention, the following is what is taking place in a practical treatment such as exemplified in Example 1, in which the ingredient "A" is a phenyl-mono-isocyanate and the medium "B" the vapor of water:

Ingredient "A" + Medium "B" = Solid "D" + Gas "E"

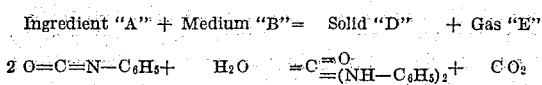

As pointed out in my copending application, Serial No. 11,813, filed February 27, 1948, the final step of heating the plastic to expand the same outside of the mold under pressure of the gas contained therein involves heating of the plastic to a temperature at which it becomes plastic and ductile so that the enclosed gas can expand the same.

The foregoing explanations will be supplemented by the following examples and the drawings attached; all this information together will allow everybody instructed in the art to apply my invention.

Example 1

On a mixer or a mixing mill I have prepared a homogeneous mix, while taking care not to include any air, out of:

- 48 grs. polyvinylchloride type Afcovil C.12, approximate average molecular weight: 75,000 (seventy-five thousand)
- 32 grs. tricresylphosphate
- 25 grs. phenyl-mono-isocyanate
- 10 grs. azo-iso-butyric-dinitrile 115 grs. total mix are allowed to relax for 4 hours before starting production.

I found it advantageous to thoroughly mix first the tricresylphosphate and the isocyanate and to allow this mixture to repose for 24 hours before the beginning of the production.

All solids employed must be extremely finely pulverized. All ingredients employed must be pure and free of water and also the mix must be protected against humidity.

Out of this total homogeneous mix of 115 grs., I have taken 50 grs. and with these I have filled in such a way as to not enclose any air, a mold having an interior circular cavity of 70 mm. in diameter, 10 mm. in height and 38.5 cm.$^3$ in volume, as in the attached Fig. 1, the dimensions of which are to be taken in proportion to the above-given dimensions of the cavity, and which is a cross cut of such circular mold. In this Fig. 1, $a$ is the body of the mold with circular grooves $c$ on its top surface, and with the circular cavity $d$, $b$ is the lid of the mold in the form of an aluminium plate.

The mold is covered with its cover $b$ and placed between the platens of a hydraulic press. A pressure of 18 metric tons is applied onto the mold closed by its cover. I have applied heat in such a way as to carry the temperature of the contents of the mold to 150° C. within 5 minutes, which temperature is thereafter sustained for 7 minutes, thus bringing the total heating time to 12 minutes. Thereafter the contents are cooled down to 20° C. The heating and cooling is effected by heating and cooling the platens of the hydraulic press in the ordinary manner.

The press is opened and so is the mold. Its contents are demolded, cleaned to shape and allowed to relax for 24 hours.

The product is thereafter heated in an oven under normal pressure and in normal atmosphere, which is well agitated, at a temperature of 110° C. for 8 minutes. Thereafter the product is cooled down to normal and allowed to relax for 24 hours at normal temperature and normal pressure. The resulting product is the initial cellular body.

This initial cellular body is then placed for 72 hours in an atmosphere of air kept saturated with vapor of water at a temperature of 40–45° C. at normal atmospheric pressure. Thereafter the body is cooled down to normal. By this treatment, the cellular body is rendered more rigid than it was before.

Example 2

On a mixer or a mixing mill I have prepared a homogeneous mix while taking care not to include any air, out of:

- 237 grs. polyvinylchloride type Rhodopas XH from Etablissements Rhone-Poulenc, in Paris, France
- 474 grs. polyvinylchloride type Rhodopas X, from Etablissements Rhone-Poulenc
- 189 grs. tricresylphosphate
- 585 grs. of a mixture of 60 weight per cent of 2.4-toluenediisocyanate with the following developed formula

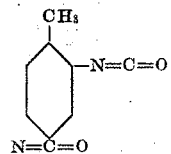

and 40 weight per cent of 2.6-toluenediisocyanate with the following developed formula

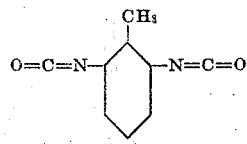

- 135 grs. cyclohexanol
- 95 grs. azo-isobutyric dinitrile
- 7 grs. alphaphenylindol 1722 grs. total mix are allowed to relax for 4 hours before starting production.

I found advantageous to mix first, 24 hours before the beginning of production, the tricresylphosphate, the two toluenediisocyanates and the cyclohexanol. These materials are thoroughly mixed. The mixture heats up, then cools down to normal and is allowed to relax for 24 hours in a closed vessel.

All solids employed must be extremely finely pulverized. All ingredients employed must be pure and free of water and also the mixture must be protected against humidity.

Out of this total homogeneous mix of 1722 grams, I have taken 230 grams and with these I have filled, in such a way as to not enclose any air, a square mold having an interior cavity of 110 mm. x 110 mm. x 15 mm. and a volume of 1181 cm.$^3$, such as represented in the attached drawing, Figs. 2, 3, 4 and 5.

Fig. 4 is a side view in actual size,

Fig. 5 is a section of part of the mold in double size, and where $a$ is the mold body, $b$ is the lid of the mold consisting of a 1 mm. aluminium plate, $c$ is a steel plate to cover mold and lid, $d$ are grooves on the top surface of mold.

Figure 1:
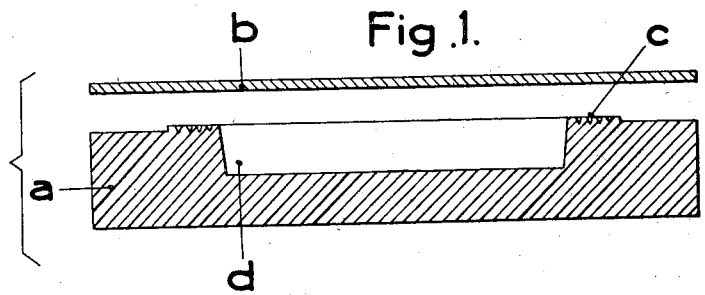
Figure 2:
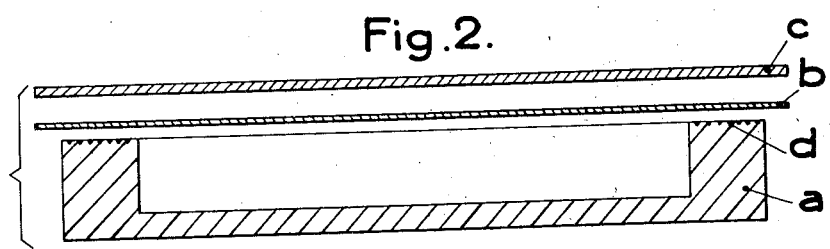
Fig. 2 is a vertical cross section in actual size.
Figure 3:
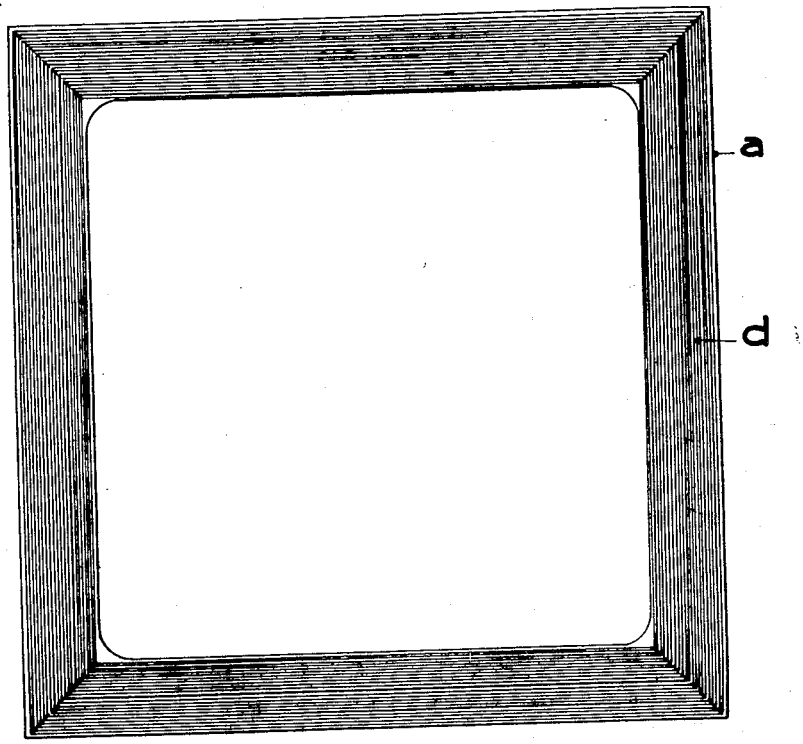
Fig. 3 is a view from above in actual size.

The mold is covered by its covers $b$ and $c$ and placed between the platens of an hydraulic press. A pressure of 45 metric tons is applied onto the mold closed by its covers. I have applied heat in such a way as to carry the temperature of the contents of the mold to 175° C. within 5 minutes, which temperature is thereafter sustained for 10 minutes, thus bringing the total heating time to 15 minutes. Thereafter the contents are cooled down to 20° C. The heating and cooling are effected by heating and cooling the platens of the hydraulic press in the ordinary manner.

The press is opened and so is the mold. Its contents are demolded, cleaned and to shape.

The product is thereafter heated in an oven under normal pressure and in normal atmosphere, which is well agitated, at a temperature of 113° C. for 30 minutes. Thereafter the product is cooled down to normal and allowed to relax for 24 hours at normal temperature and normal pressure.

The resulting product is the initial cellular body having a specific gravity of 0.110 gram per cm.³

The initial cellular body is then placed in a vessel as per attached drawings, Fig. 6, in which $a$ is a circular vessel made of steel sheet 545 mm. in diameter, 290 mm. high, resting on four legs about 250 mm. high, $b$ is the lid of the vessel, made of steel sheet, with handle, $c$ is a wire mesh platen, supported by angle iron at 140 mm. above the bottom of the vessel, $d$ is water covering the bottom of the vessel up to an height of 80 mm., $e$ is a mercury thermometer indicating the temperature at which the treatment is carried out. The thermometer is located in the lid of the vessel at about 30 mm. from its center, and the lower end of the thermometer being 200 mm. above the bottom of the vessel, $f$ is a regulated gas burner, $g$ is the cellular body in position for treatment.

In the vessel and under conditions outlined in the drawing and in its description, the initial cellular body is kept at 81° C. for 120 minutes.

Thereafter the body is allowed to cool down to normal temperature in normal atmosphere and under normal pressure, and allowed to relax for 24 hours.

The result is the final cellular body, of a specific gravity of 0.035 gram per cm.³

*Example 3*

I followed the same procedure as outlined in Example 1, with the following exceptions:

The mix consists of—

312 grs. polyvinylchloride type Rhodopas XH from Etablissements Rhone-Poulenc
624 grs. polyvinylchloride type Rhodopas X from Etablissements Rhone-Poulenc
264 grs. tricresylphosphate
420 grs. of a mixture of 60 weight per cent of 2.4-toluenediisocyanate and 40 weight per cent of 2.6-toluenediisocyanate
120 grs. azo-isobutyric dinitrile
10 grs. alpha-phenylindol 1750 grs. total mix I found it advantageous to thoroughly mix first this tricresylphosphate and the diisocyanates, and to allow the mixture to repose for 24 hours before the beginning of the production.

The initial body thus obtained has a specific gravity of 0.108 per cm.³. It is sufficiently soft to allow impression by normal finger pressure.

This initial body is then heated in the vessel as per Fig. 6 at 78° C. for 120 minutes.

Figure 7:
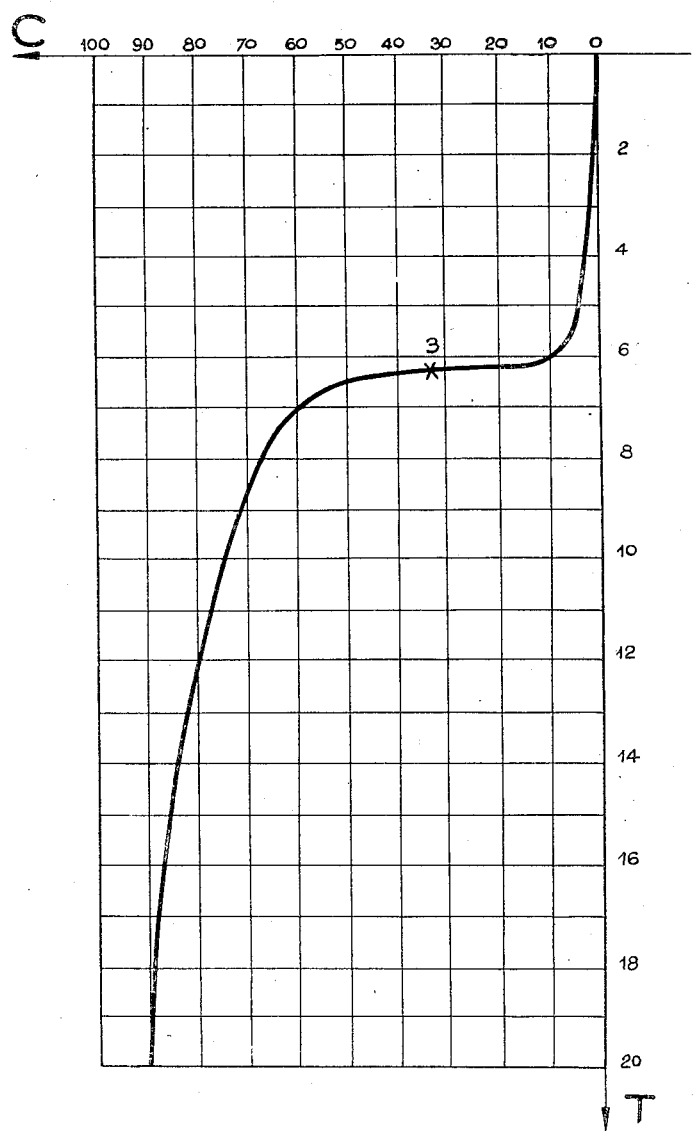

The result is a final cellular body of a specific gravity of 0.055 gram per cm.³. Its resistance against compression and flexion is given by the attached diagrams, Figs. 7 and 8, which signifies a considerable stiffening of the thermoplastic forming the skeleton, especially when one considers that the skeleton has expanded to a volume about double of the one it occupied in the initial body.

*Example 4*

On a mixer or a mixing mill I have prepared an homogeneous mix, while taking care not to include any air, out of:

360 grs. polyvinylchloride type Rhopodas XH
718 grs. polyvinylchloride type Rhodopas X
322 grs. tricresylphosphate
392 grs. of a mixture of 60 weight per cent of 2.4-toluenediisocyanate and 40 weight per cent of 2.6-toluenediisocyanate
126 grs. azo-isobutyric dinitrile
11 grs. alpha-phenylindol 1929 grs. total mix are allowed to relax for 4 hours before employed for production.

I found it advantageous to thoroughly mix first the tricresylphosphate and the two toluenediisocyanates and to allow the mixture to repose for 24 hours before the beginning of production.

All solids employed must be extremely finely pulverized. All ingredients employed must be pure and free of water, also the mix must be protected against humidity. Out of this total homogeneous mix of 1929 grs., I have taken 243 grs. and with them I have filled, in such a way as to not enclose any air, a square mold having an interior cavity of 110 mm. x 110 mm. x 15 mm. and a volume of 1181 cm.³, such as represented in the attached drawing, Figs. 2, 3, 4 and 5, as described in Example 2.

The mold is covered by its covers $b$ and $c$ and placed between the platens of a hydraulic press. A pressure of 49 metric tons is applied onto the mold closed by its covers. I have then applied heat in such a way as to carry the temperature of the contents of the mold to 175° C. within 10 minutes, which temperature is thereafter sustained for 5 minutes, thus bringing the total heating time to 15 minutes. Thereafter the contents are cooled down to 20° C. The heating and cooling are effected by heating and cooling the platens of the hydraulic press in the ordinary manner.

The press is opened and so is the mold. Its contents are demolded and cleaned to shape.

The product is thereafter heated in an oven under normal pressure and in normal atmosphere which is well agitated, at a temperature of 107 to 110° C. for 40 minutes. Thereafter this product is cooled down to normal. The resulting product is the initial cellular body.

This body is then placed in a normal atmosphere of an average temperature of approximately 20° C. and of a normal average relative humidity. By this exposure the hardness of the body increases in the course of time as shown in the attached graphic Fig. 9.

The indicated hardness is established by the Afnor method, which is characterized by the relation $$\frac{1000}{X_2 - X_1}$$

in which: $X_1$ is the penetration, expressed in 1/100 mm., of a ball of 10 mm. diameter under a load of 50 grs. $X_2$ is the penetration, expressed in 1/100 mm., of a ball of 10 mm. diameter under a load of 1000 grs.

In all these examples, and in industrial practice, the result will be influenced by room temperature and humidity.

The foregoing explanations relate only some of the many possible applications and execution of my method. My invention is to comprise as well the principle of my method such as outlined and exemplified as all cellular materials and bodies manufactured or heated in a manner as to make use of this my principle, and the scope of my invention shall not be limited otherwise than by the following claims, in particular and as a total.

What I claim is:

1. The method of forming cellular products which comprises mixing a polyvinyl resin with azo-iso-butyric dinitrile and phenyl-mono-isocyanate, all in a substantially dry state, heating said mixture in a mold in the substantial absence of air to a temperature high enough to decompose said azo-iso-butyric dinitrile and thereby to liberate gas within said thermoplastic material, cooling said material and removing it from the mold, heating it in an oven to a temperature of about 110° C., allowing it to cool to secure an initial cellular structure and then subjecting it to the action of water vapor at an elevated temperature to react with said phenyl-isocyanate, whereby carbon dioxide is liberated within the initially formed cell structure, and the mass is further expanded.

2. The method of stiffening and further expanding a cellular polymerized organic thermoplastic body comprising introducing a dry, heat stable isocyanate into a dry mixture of isocyanate inert materials convertible to a cellular body by heating in a mold, heating said mixture in a mold to form a cellular body, cooling said cellular body in the mold and removing it from the mold, heating it to a temperature at which the thermoplastic material becomes plastic and expandable by pressure of the gas developed therein, allowing the cellular body to cool and then subjecting it to the action of water vapor at an elevated temperature to react with said isocyanate.

3. The method of forming cellular products which comprises mixing a polymerized organic thermoplastic resin with a dry, finely divided isocyanate-inert thermal gas blowing agent and with an isocyanate, all in a substantially dry state, heating said mixture in a closed mold to a temperature high enough to decompose said gas blowing agent and thereby liberate gas within the thermoplastic material, cooling said material and removing it from the mold, heating it to a temperature at which the thermoplastic material becomes plastic and expandable by pressure of the gas developed therein, allowing it to cool, and then subjecting it to the action of water vapor at an elevated temperature to react with said isocyanate.

4. The method of forming cellular products which comprises mixing a polymerized organic thermoplastic resin with a thermal gas blowing agent selected from the group consisting of azoisobutyric dinitrile, diamino benzene and nitrourea, and with an isocyanate, all in a substantially dry state, heating said mixture in a mold in a substantial absence of air to a temperature high enough to decompose said gas blowing agent and thereby liberate gas within said thermoplastic material, cooling said material and removing it from the mold, heating it to a temperature at which the thermoplastic material becomes plastic and expandable by pressure of the gas developed therein, allowing it to cool, and then subjecting it to the action of water vapor at an elevated temperature to react with said isocyanate.

5. The method of forming cellular products as claimed in claim 4, wherein the isocyanate comprises a mixture of 2,4-toluenediisocyanate and 2,6-toluenediisocyanate.

6. In a method of forming a cellular product by heating a dry, inert pulverulent mixture of a polymerized organic thermoplastic material and a blowing agent within a closed mold, whereby the blowing agent decomposes to develop an inert gas to convert the inert plastic to a cellular body within the mold, the improvement comprising the steps of first incorporating an isocyanate inert to the blowing agent in the dry mix from which the cellular body is formed, heating the mixture in a mold to form the cellular body containing undecomposed isocyanate, removing said cellular body from the mold, heating the same to a temperature at which the thermoplastic material becomes plastic and expandable by pressure of the gas developed therein, allowing it to cool, and then subjecting the cellular body containing the isocyanate to the action of externally applied water vapor at an elevated temperature to react with said isocyanate.

PASCAL J. CARPENTIER.

REFERENCES CITED

The following references are of record in the file of this patent:

UNITED STATES PATENTS

| Number | Name | Date |
|---|---|---|
| 2,383,110 | Cooper | Aug. 21, 1945 |

OTHER REFERENCES

Goggin et al.: "Foamed Plastics," British Plastics, December 1947, pages 528–531. 18–48S.